(12) United States Patent
Karnofski et al.

(10) Patent No.: US 10,422,301 B2
(45) Date of Patent: Sep. 24, 2019

(54) TELESCOPING ELECTRICAL CABLE

(71) Applicant: THE BOEING COMPANY, Chicago, IL (US)

(72) Inventors: Kent Edmund Karnofski, Lake Forest Park, WA (US); Chris T. Jasklowski, Redmond, WA (US); Michael Jay Burghdoff, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 914 days.

(21) Appl. No.: 14/797,930

(22) Filed: Jul. 13, 2015

(65) Prior Publication Data
US 2017/0016413 A1 Jan. 19, 2017

(51) Int. Cl.
| | |
|---|---|
| *F02K 1/76* | (2006.01) |
| *B64D 27/16* | (2006.01) |
| *B64D 33/04* | (2006.01) |
| *F02K 1/12* | (2006.01) |
| *F02K 3/075* | (2006.01) |

(Continued)

(52) U.S. Cl.
CPC .............. *F02K 1/763* (2013.01); *B64D 27/16* (2013.01); *B64D 33/04* (2013.01); *F02K 1/09* (2013.01); *F02K 1/12* (2013.01); *F02K 1/1207* (2013.01); *F02K 1/15* (2013.01); *F02K 1/16* (2013.01); *F02K 1/64* (2013.01); *F02K 1/70* (2013.01);

(Continued)

(58) Field of Classification Search
CPC . F02K 1/09; F02K 1/12; F02K 1/1207; F02K 1/15; F02K 1/16; F02K 1/64; F02K 1/70; F02K 1/72; F02K 1/76; F02K 1/763; F02K 3/075; F05D 2260/50
See application file for complete search history.

(56) References Cited

U.S. PATENT DOCUMENTS

| | | | | |
|---|---|---|---|---|
| 3,815,357 A | * | 6/1974 | Brennan | ............. F02K 1/70 244/76 B |
| 7,721,549 B2 | * | 5/2010 | Baran | ............. F02K 1/002 239/265.19 |

(Continued)

FOREIGN PATENT DOCUMENTS

WO WO-9612881 A1 * 5/1996 ............... F02K 1/09

OTHER PUBLICATIONS

U.S. Appl. No. 14/070,393, filed Nov. 1, 2003.
(Continued)

*Primary Examiner* — Gerald L Sung
*Assistant Examiner* — Marc J Amar
(74) *Attorney, Agent, or Firm* — Marshall, Gerstein & Borun LLP (57) ABSTRACT

An aircraft includes a jet engine and a telescopic tube assembly positioned on the jet engine. The telescopic tube assembly includes one end portion of the telescopic tube assembly which is associated with a thrust reverser translating sleeve of the jet engine and an opposing end portion of the telescopic tube assembly which is associated with a fixed portion of the of the jet engine. A jet engine includes a telescopic tube assembly positioned on the jet engine. The telescopic tube assembly includes one end portion of the telescopic tube assembly which is associated with a thrust reverser translating sleeve of a jet engine and an opposing end portion of the telescopic tube assembly which is associated with a fixed portion of the of the jet engine.

17 Claims, 7 Drawing Sheets

(51) Int. Cl.
*F02K 1/16* (2006.01)
*F02K 1/15* (2006.01)
*F02K 1/64* (2006.01)
*F02K 1/70* (2006.01)
*F02K 1/09* (2006.01)
*F02K 1/72* (2006.01)

(52) U.S. Cl.
CPC .................. *F02K 1/72* (2013.01); *F02K 1/76* (2013.01); *F02K 3/075* (2013.01); *F05D 2260/50* (2013.01)

(56) References Cited

U.S. PATENT DOCUMENTS

| | | | | |
|---|---|---|---|---|
| 8,127,531 B2* | 3/2012 | Parham | | F02K 1/09 60/226.3 |
| 8,162,266 B2* | 4/2012 | Soenarjo | | B64D 15/12 242/388.1 |
| 8,511,062 B2* | 8/2013 | Ramlaoui | | F02K 1/09 239/265.27 |
| 8,708,280 B2* | 4/2014 | Blanchard | | B64C 9/22 244/131 |
| 8,899,529 B2* | 12/2014 | Sanderson | | B64C 9/22 244/215 |
| 9,021,813 B2* | 5/2015 | Jasklowski | | F02K 1/12 239/265.19 |
| 9,091,230 B2* | 7/2015 | Dittmann | | F02K 1/1207 |
| 9,803,586 B1* | 10/2017 | Jackowski | | F02K 1/18 |
| 10,184,425 B2* | 1/2019 | Jackowski | | F02K 1/12 |
| 2008/0190095 A1* | 8/2008 | Baran | | F02K 1/002 60/226.3 |
| 2009/0067993 A1* | 3/2009 | Roberge | | F02C 7/047 415/145 |
| 2010/0064660 A1* | 3/2010 | Vauchel | | B64D 15/12 60/226.2 |
| 2010/0115958 A1* | 5/2010 | Parham | | F02K 1/09 60/771 |
| 2010/0130065 A1* | 5/2010 | Teague | | B64C 9/22 439/640 |
| 2010/0327111 A1* | 12/2010 | Sanderson | | B64C 9/22 244/99.3 |
| 2011/0024566 A1* | 2/2011 | Soenarjo | | B64D 15/12 244/131 |
| 2013/0020408 A1* | 1/2013 | Jasklowski | | F02K 1/12 239/265.11 |
| 2013/0075494 A1 | 3/2013 | Vaughan et al. | | |
| 2013/0306755 A1* | 11/2013 | Dittmann | | F02K 1/1207 239/265.25 |
| 2017/0016413 A1* | 1/2017 | Karnofski | | F02K 1/09 |
| 2017/0218882 A1* | 8/2017 | Jackowski | | F02K 1/12 |

OTHER PUBLICATIONS http://www.larsonelectronics.com, 2000 Watt Pneumatic Light Tower—Extends to 18 Feet—500W Halogens—Individually Controlled, 2013.

* cited by examiner

TELESCOPING ELECTRICAL CABLE

FIELD

The present invention relates to a tube to protect electrical cable, and more particularly, to a tube capable of maintaining protective arrangement with the cable as the distance between opposing ends of the tube changes.

BACKGROUND

In addition to the cables being subjected to environmental conditions and the exhaust thrust, the cables will be subjected to the movement of the thrust reverser translatable sleeve. The sleeve in operation will cycle from a stowed position to a deployed position and back to the stow position. In this process, the cable needs to be protected from being pinched during this cycling process, particularly, with the thrust reverser moving from a deployed position to the stow position. These problems could also arise, without a VAFN associated with the jet engine. In some instances, where instrumentation and possibly power are needed, for example, in the operation of the translation of the thrust reverser sleeve.

SUMMARY

An aircraft includes a jet engine and a telescopic tube assembly positioned on the jet engine. The telescopic tube assembly includes one end portion of the telescopic tube assembly which is associated with a thrust reverser translating sleeve of the jet engine and an opposing end portion of the telescopic tube assembly which is associated with a fixed portion of the of the jet engine assembly.

A jet engine includes a telescopic tube assembly positioned on the jet engine. The telescopic tube assembly includes one end portion of the telescopic tube assembly which is associated with a thrust reverser translating sleeve of a jet engine and an opposing end portion of the telescopic tube assembly which is associated with a fixed portion of the of the jet engine assembly.

A telescopic tube assembly includes a first tube segment having an interior dimension and a second tube segment having an exterior dimension, wherein the interior dimension of the first tube segment is greater than the exterior dimension of the second tube segment, such that the first tube segment slides within the second tube segment. A cable is further provided which is positioned within and extends along the first and second tube segments.

A method for protecting a cable, including the steps of providing a first tube segment having an interior dimension; a second tube segment having an exterior dimension, wherein the interior dimension of the first tube segment is greater than the exterior dimension of the second tube segment, such that the first tube segment slides within the second tube segment. Also providing a cable positioned within and extends along the first and second tube segments; wherein: one end of one of the first and second tube segment is affixed to a thrust reverser translating sleeve of a jet engine assembly and another end of the other of the first and second tube segment is affixed to a fixed portion of the jet engine assembly. The method further includes the step of moving the thrust reverser translating sleeve from a closed position to an opened position thereby positioning the first and second tube segments from a stowed position to a deployed position.

The features, functions, and advantages that have been discussed can be achieved independently in various embodiments or may be combined in yet other embodiments further details of which can be seen with reference to the following description and drawings.

DESCRIPTION

Figure 1:
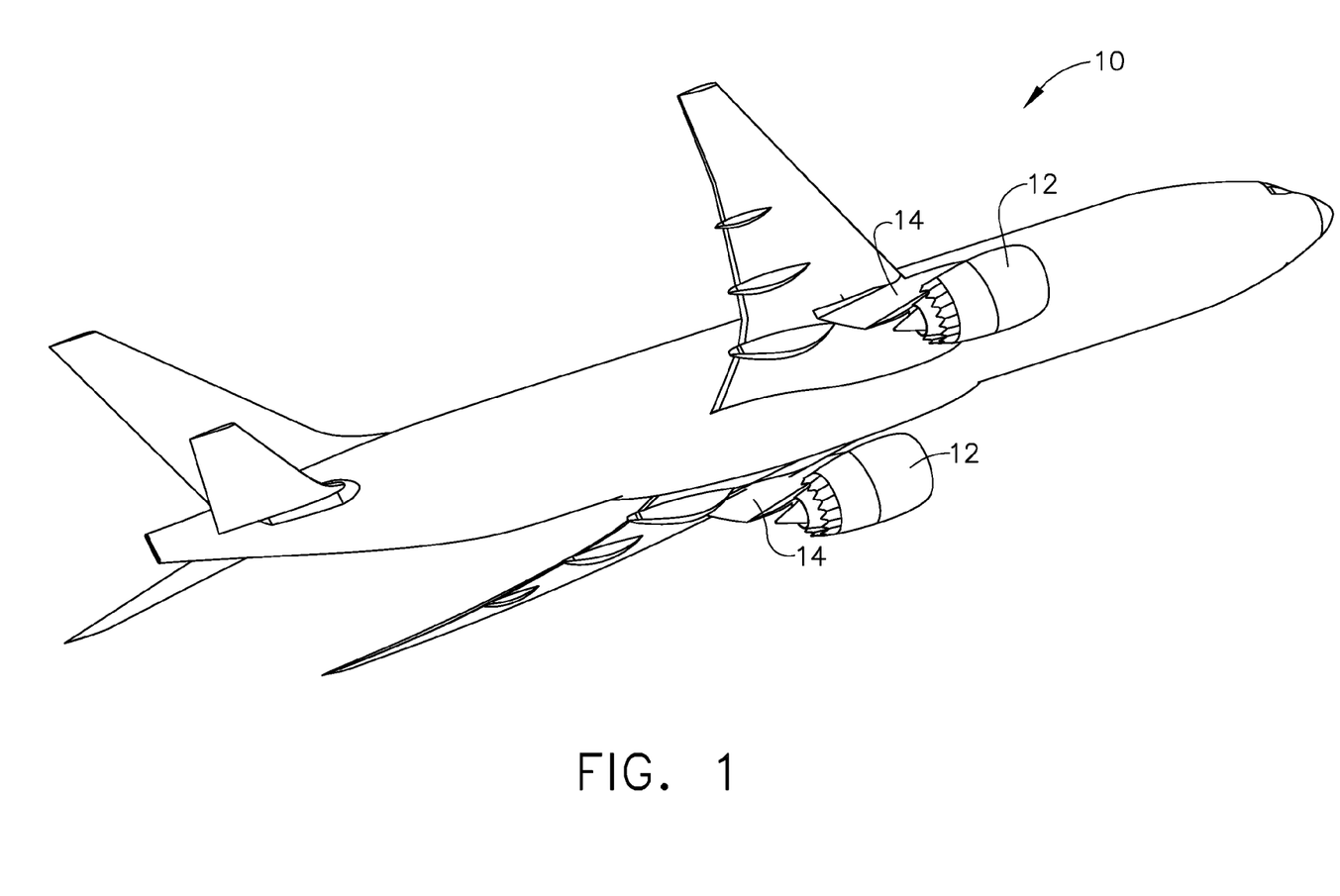
FIG. 1 is a perspective view of an aircraft with a jet engine secured to the aircraft.

In referring to FIG. 1, aircraft 10 is shown with jet engine assembly 12 secured to aircraft 10 with pylon 14. Jet engine assembly 12 provides forward propulsion for aircraft 10 and as will be discussed herein, will also provide reduction of forward motion of aircraft 10 or braking of aircraft 10. The braking of aircraft 10 will be with the use of a thrust reverser assembly positioned on each jet engine assembly 12 at the time the aircraft has touched down during the landing process.

Figure 2:
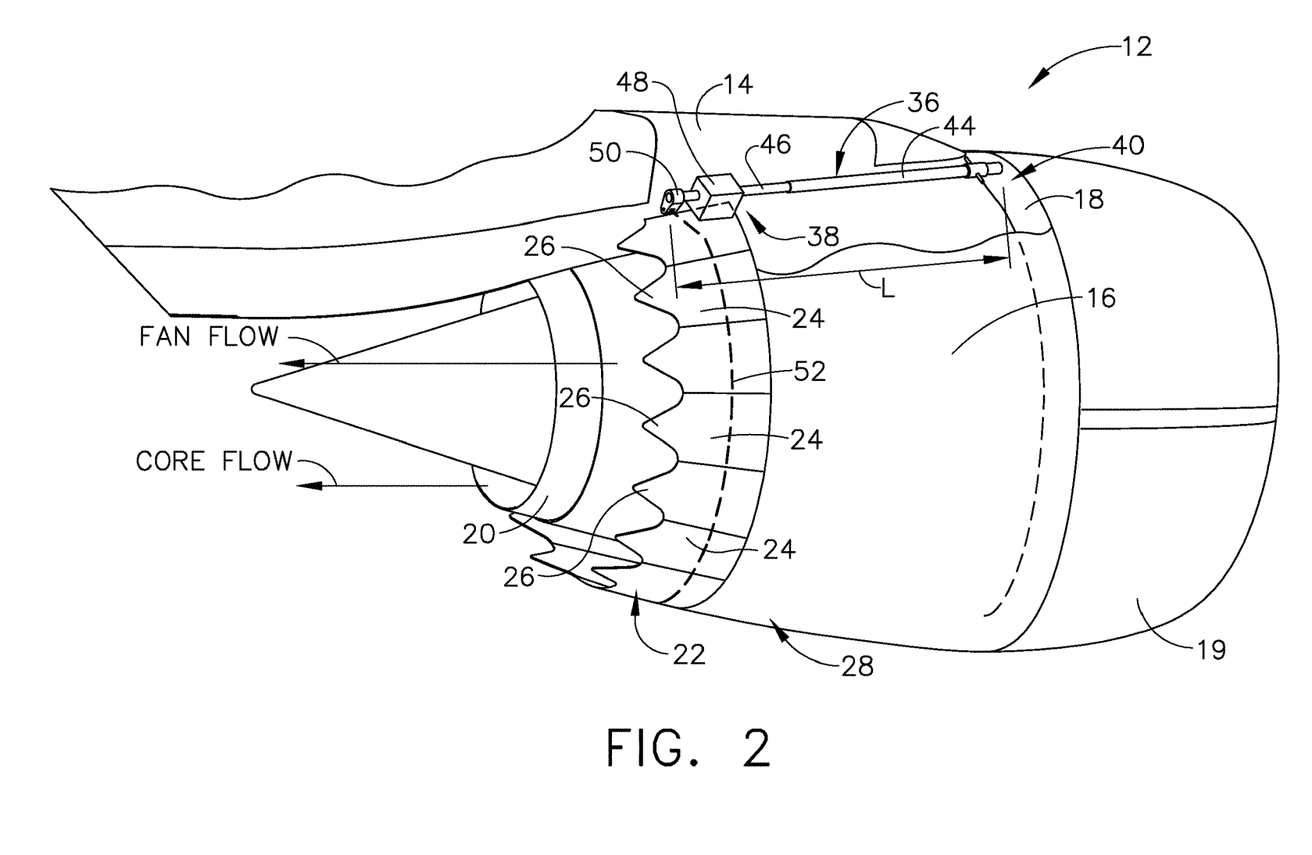
FIG. 2 is a partially broken away enlarged perspective view of the jet engine assembly of FIG. 1, showing a first embodiment of the telescopic tube.

In referring to FIG. 2, jet engine 12 assembly, in this example, is a turbofan engine secured to aircraft 10 with pylon 14 of the jet engine assembly 12. In FIG. 2, thrust reverser translation sleeve 16 is partially broken away revealing a fixed portion or wall member 18 in forward portion 19 in engine assembly 12. Forward portion 19 remains in a fixed configuration with respect to aircraft 10 in contrast to sleeve 16, which is moveable away from wall member 18 with the deployment of the thrust reverser of engine assembly 12, which will be discussed in further detail below.

A core engine nacelle (not shown) surrounds the core engine of this turbofan engine 12. Engine assembly 12 provides thrust from both a core flow of engine exhaust exiting a core flow nozzle 20 that forms a downstream end of the core engine nacelle, and a fan flow exiting from a variable area fan nozzle 22 mounted (e.g. bolted) to the downstream end or lip area of thrust reverser translating sleeve 16. In this embodiment, sleeve 16 overlaps at least a portion of the core engine nacelle.

Variable area fan nozzle 22 includes a plurality of elastically deformable or pivotable rigid petals 24 which are configured to alter the fan flow passing through the fan duct when the petals 24 are deflected inwardly or outwardly from a normal position. Petals 24 are disposed side by side along a trailing lip of the thrust reverser translation sleeve 16. If the thrust reverser translation sleeve 16 is one-piece axially translating, as in the present embodiment, then the array of petals 24 extends around a major portion of the circumference of sleeve 16, from one side of the engine pylon 14 to the other. On the other hand, if the thrust reverser sleeve 16 includes two axially translatable half-cowls mounted on rails fixed to upper and lower beams, then the petal 24 array consists of two sets of petals 24 attached to the respective half-cowls, each petal set extending from the respective upper beam to the respective lower beam on a respective side of engine assembly 12.

Optionally, petals 24 may have chevrons 26 attached to the distal ends thereof. In accordance with one example petals 24 are flexible and have one end fastened to the lip area of sleeve 16, petals 24 are pre-stressed such that in a non-deflected state, they extend outwardly or in a normal direction, which state is suitable for reducing noise during take-off, approach and landing. With petals 24 deflected inwardly from their nominal position, which will be discussed herein, such as during cruise flight conditions, fuel efficiency can be maximized. When the deflected condition is de-activated, petals 24 return to their pre-stressed state.

Figure 5:
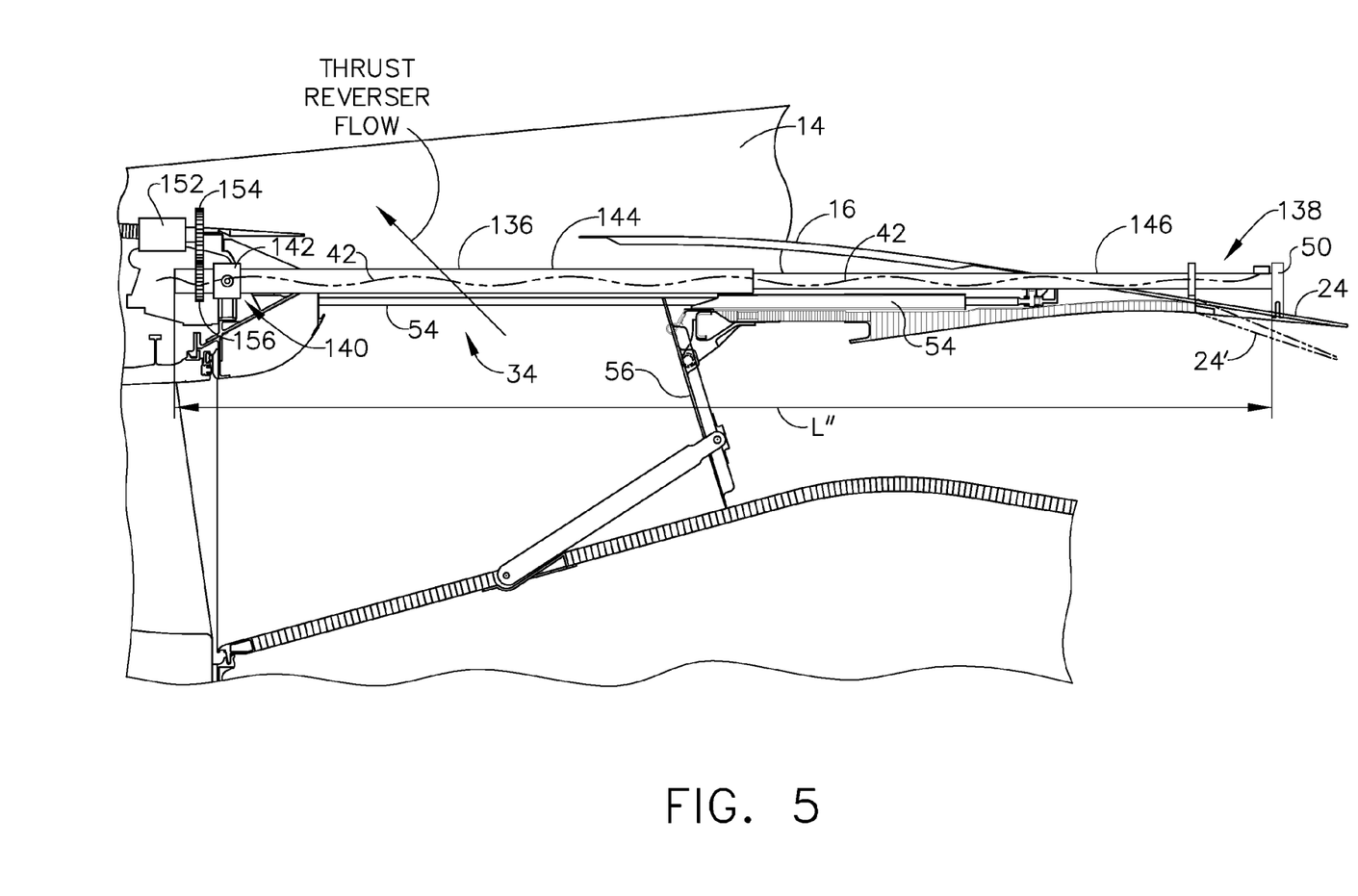
FIG. 5 is an enlarged broken away partial view of the jet engine as seen in FIG. 2 with the thrust reverser in a fully deployed position and the second embodiment of the telescopic tube for carrying cable within the telescopic tube.

In order to provide electrical control signals and/or electrical power to an aft end portion 28 of reverse thruster translation sleeve 16 to operate equipment such as variable area fan nozzle 22, cables are needed to extend from a fixed position or wall member 18 of engine 12 to aft end portion 28 of reverse thruster translational sleeve 16. Cables that would be extended from wall member 18 to aft end portion 28 of sleeve 16 would be exposed to harsh environmental conditions. With sleeve 16 positioned in a deployed position, as seen in FIG. 5, cables would have to span across opening 34 and be exposed to engine exhaust thrust, weather elements including electromagnetic interference or lightening events. Moreover, with sleeve 16 moving from a stowed position as seen in FIG. 3 to a deployed position in FIG. 5 and back to a stowed position in FIG. 3, an unprotected cable would be exposed to being pinched in the process.

In FIG. 2, first embodiment of telescopic tube assembly 36, is shown. Telescopic tube assembly 36 is positioned on engine 12. One end portion 38 of the telescopic tube assembly 36 associated with thrust reverser translation sleeve 16 of the jet engine; and an opposing end portion 40 of the telescopic tube assembly 36 is associated with a fixed portion or wall member 18 of the of the jet engine assembly 12. A fixed portion 18 of jet engine assembly 12 includes utilizing a structure of engine assembly 12 which remains in a fixed position relative to the aircraft 10 such as pylon 14, the nacelle (housing structure), engine framework and/or engine supports or a fixed portion of a reverse thruster. Telescopic tube assembly 36 is constructed of a strong, durable and conductive material such as steel, aluminum, titanium or the like. Telescopic tube assembly 36 will surround and protect cable 42, as seen for example in FIGS. 3-5, from engine assembly 12 exhaust with sleeve 16 deployed, as seen for example in FIG. 5. In addition to protecting cable 42 from harsh environments such as engine exhaust, weather, the construction of tube assembly 36 also provides cable 42 a Faraday cage to channel electrical current from an electromagnetic interference or lightening event around and past cable 42. Assembly 36 will also protect cable 42 from a mechanical pinching event particularly with sleeve 16 returning from a deployed position as seen in FIG. 5 to a stowed position as seen in both FIGS. 2 and 3.

In referring to FIG. 2, telescopic tube assembly 36, has end portion 38 and opposing end portion 40 each affixed to sleeve 16 and fixed portion of jet engine assembly 12 or wall member 18 respectively. This can be accomplished by a variety of conventional ways. In this example, (not shown) end portion of tube assembly 36 engages a bracket and the bracket is secured to sleeve 16 such as with bolts. Similarly, a bracket (not shown) can engage the opposing end portion 40 of tube assembly 36 and in turn secured to wall member 18 by way of bolting the bracket to wall member 18.

Figure 3:
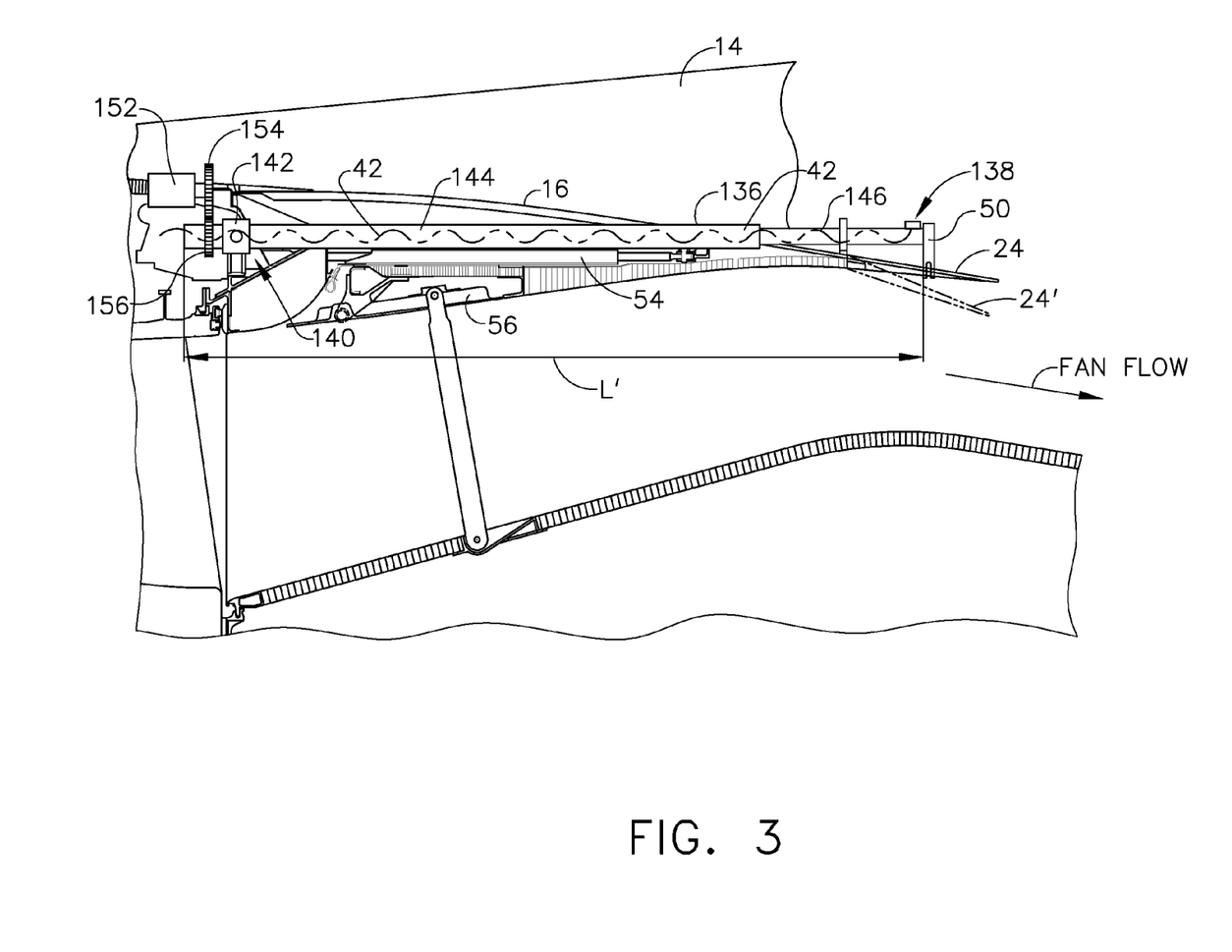
FIG. 3 is an enlarged broken away partial view the jet engine as seen in FIG. 2 showing the thrust reverser in a stowed position and a second embodiment of the telescopic tube for carrying cable within the telescopic tube.
Figure 4:
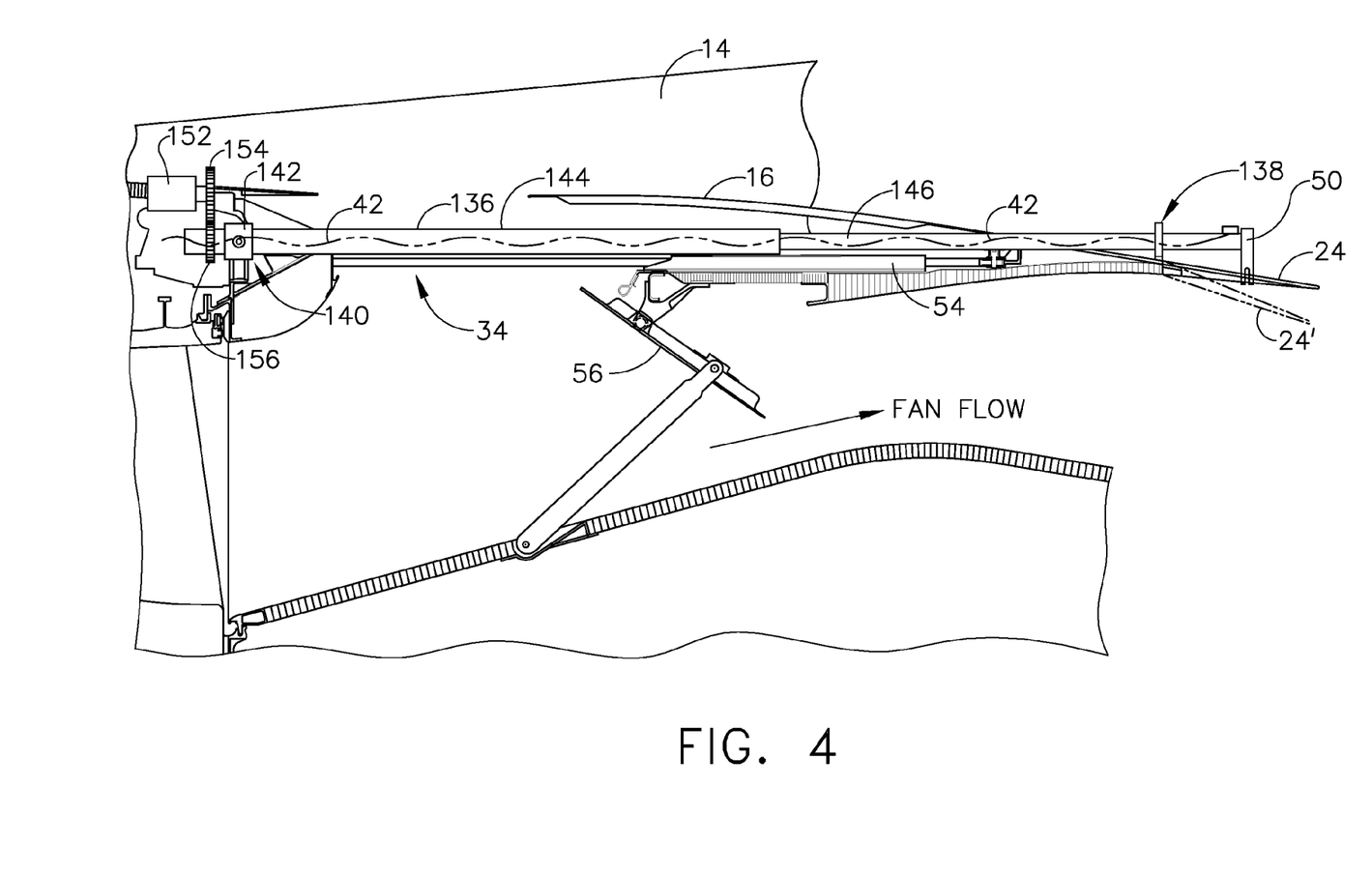
FIG. 4 is an enlarged broken away partial view of the jet engine as seen in FIG. 2 with the thrust reverser in a partially deployed position and the second embodiment of the telescopic tube for carrying cable within the telescopic tube.

Electrical cable 42, as shown for example in FIGS. 3-5, extends similarly through first embodiment of tube assembly 36 of FIG. 2. Cable 42 extends within and along first embodiment of telescopic tube assembly 36. In various examples, there may be a need for multiple cables 42 positioned within telescopic tube assembly 36. Cable 42 in this example is coiled, such that cable 42 will extend in length with a tension force placed on and along a length of cable 42. Cable 42 will tend to move into a shorter configuration with a release of the tension on cable 42, at a time the tension force has been removed. This configuration of cable 42 is much like that of a telephone receiver cable.

In this first embodiment of telescopic tube assembly 36, has a first tube segment 44 and a second tube segment 46. A plurality of segments can be employed to accomplish the needed extension and contraction of the length of telescopic tube assembly 36. In this example, as seen in FIG. 2, telescopic tube assembly 36 is in a stowed position having a first length "L". Since first embodiment of tube assembly 36 of FIG. 2 operates in the longitudinal direction the same as a second embodiment of telescopic tube assembly 136, seen in FIGS. 3-5, we will refer to these FIGS. 3-5, in explaining the longitudinal operation of the first embodiment of the telescopic tube assembly 36. In referring to FIG. 3, second embodiment of telescopic tube assembly 136 has a similar stowed length of L' to that of the stowed length L of first embodiment of telescopic tube assembly 36 in FIG. 2. Likewise, both first embodiment of tube assembly 36 and second embodiment of tube assembly 136 have a similar deployed second length L" with thrust reverser translation sleeve 16 in a fully deployed position. Both first and second embodiments of telescopic tube assembly 36 and 136 respectively, extend across opening 34, as seen, for example, in FIGS. 4 and 5, as thrust reverser translation sleeve 16 moves toward a fully deployed position and attains that position as seen in FIG. 5. Opening 34, with thrust reverser deployed, is positioned between thrust reverser translation sleeve 16 and fixed portion or wall member 18.

For purposes of the first embodiment, first segment 44 has a greater interior dimension than an exterior dimension of second tube segment 46, permitting second tube segment 46 to slide within first tube segment 44 and provide the telescoping function of assembly 36. The reverse case could also be employed where the interior dimension of the second segment 46 could be greater than the exterior dimension of the first segment 44 permitting first segment 44 to slide within second segment 46. In either configuration, telescopic tube assembly 36 will extend from a stowed position, with translation sleeve 16 in a closed position, as seen, for example, in FIG. 3 to a fully deployed position, with translation sleeve 16 in an open position, as shown, for example, in FIG. 5, and back to the stowed position of FIG. 3, with translation sleeve 16 in a closed position.

In referring to FIG. 2, to the first embodiment of telescopic tube assembly 36, carries cables 42 (not shown) in FIG. 2, however, are seen, for example, in FIG. 3 showing the second embodiment of the telescopic tube assembly 136. Cables 42 bring power and control signals to motor 48. Motor 48 when powered and activated turns lever 50, which is engaged to pull on constriction cable 52 which, in this embodiment, extends circumferentially about petals 24 and connects to a corresponding lever on the opposing side of pylon 14, (not shown). This same arrangement as described herein for first embodiment of telescoping tube assembly 36, motor 48 and lever 50 is also positioned on the opposing side of pylon 14. Thus, when motor 48 on either side of pylon is instructed to place tension on constriction cable 52, levers 50 on either side of pylon 14 rotate in a direction toward pylon 14 placing tension on constriction cable 52 thereby forcing petals 24 to move inwardly relative to the fan flow. With an opposite instructional signal sent to motor 48 positioned on opposing sides of pylon 14, levers 50 rotate in a direction away from pylon 14 thereby releasing the tension in constriction cable 52, petals 24 move back to their normal unrestricted position.

In referring to FIGS. 3-7, second embodiment of telescopic tube assembly 136 is shown. As mentioned earlier, the telescopic function of the second embodiment of tube assembly 136 operates similarly as the first embodiment of telescopic tube assembly 36. A discussed earlier, the configuration of the first and second tube segments 44 and 46 permit these segments to slide relative to one another. Similarly first tube segment 144 and second tube segment 146 in the second embodiment of the telescopic tube assembly 136 slide within one another thereby altering the length of the extension of the second embodiment of telescopic tube assembly 136. The additional feature of the second embodiment of tube assembly 136 over that of the first embodiment of assembly 36, is that tube assembly 136 can also transmit a torque force along assembly 136, which will be discussed in more detail below. This torque force will be used to rotate lever 50 to apply tension or release tension on constriction cable 52 that is shown in FIG. 2 of the first embodiment assembly 36.

In referring to FIG. 3, thrust reverser translation sleeve 16 is in a stowed positioned. Any thrust from engine assembly 12 is exiting the rear of engine assembly 12 as core flow and fan flow in this example. In this stowed position, actuator 54 used to deploy sleeve 16 and return sleeve 16 to a stowed position, is in a stowed position with sleeve 16. As actuator 54 extends, as seen in FIG. 4, sleeve 16 moves in a rearward direction toward an aft direction of aircraft 10. Opening 34 as described earlier, now increases in area as actuator 54 continues to move sleeve 16 toward the aft direction of aircraft 10. As this is occurring, blocker plate 56 begins to move from an unblocking position, as shown in FIG. 3, to a blocking position of fan flow in FIG. 5. With blocker plate 56 in a blocking position relative to the fan flow, in this example, the fan flow is directed angularly in a more forward direction of aircraft 10 as a thrust reverser flow, creating a braking effect on a forward movement of aircraft 10. This is typically employed at the time of landing. to slow aircraft 10 on the runway and alleviate undue use of the wheel brakes on aircraft 10.

As can be seen in FIGS. 3-5, cable 42 is maintained in a protective position in second embodiment of telescopic tube assembly 136 similarly as cable 42 is maintained in a protective position for the first embodiment of the telescopic tube assembly 36, as actuator 54 moves sleeve 16 from a stowed to a deployed and back to the stowed position.

Figure 6:
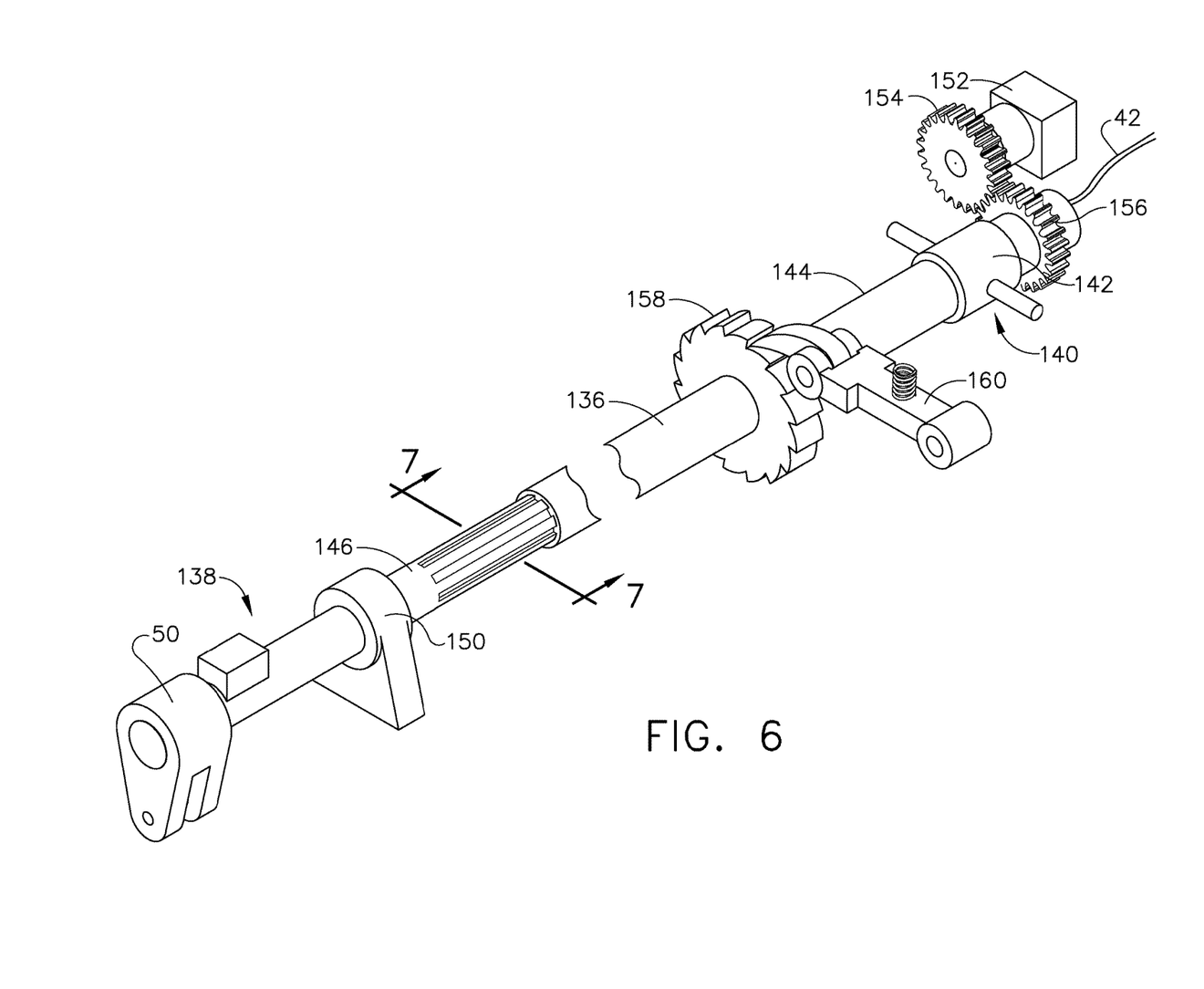
FIG. 6 is an enlarged perspective view of the second embodiment of the telescopic tube seen in FIG. 5.
Figure 7:
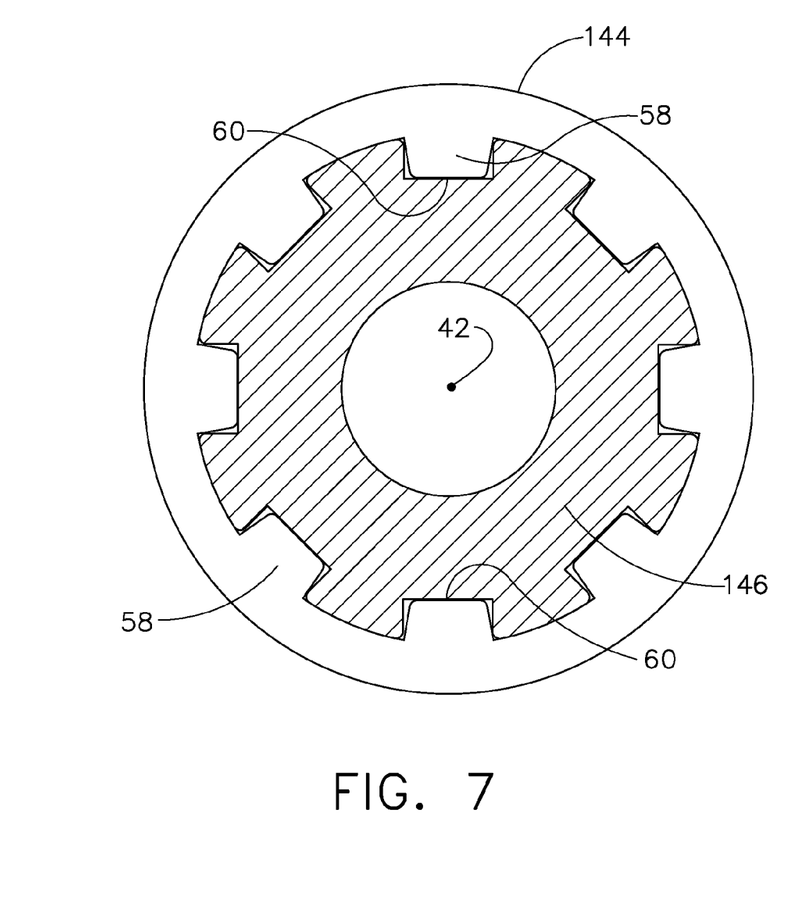
FIG. 7 is a cross section view taken along line 7-7 of FIG. 6.

In referring to FIGS. 6 and 7, second embodiment of telescopic tube assembly 136 can be seen. The second embodiment of telescopic tube assembly 136 includes the ability for tube assembly 136 to transmit a torque force along assembly 136. First, tube segment 144 and second tube segment 146 slide relative to one another permitting the adjustment of length of the second embodiment of the telescopic tube assembly. Similarly as was mentioned above with respect to the first embodiment of the telescopic tube assembly 36, wherein first and second tube segments 44 and 46 can be sized such that one of the segments slides within the other. The same is true with the sizing of first and second tube segments 144 and 146 for the second embodiment of the telescopic tube assembly 136. One of the first and second tube segments 144 and 146 will slide within the other tube segment. Additionally, tube assembly 136 similarly protects cable 42 as described above for tube assembly 36. Assembly 136 protects cable 42 from the harsh environments of engine exhaust, weather and electromagnetic interference and lightening by providing a Faraday cage to cable 42. Moreover, the confinement provided by tube assembly 136 will provide protection of cable 42 from being pinched during the movement of sleeve 16 between stowed and deployed positions.

However, in the second embodiment of the telescopic tube assembly 136, first tube segment 144 is constructed of one of a projection 58 and groove which extends along a length of the first tube segment 144. Second tube segment 146 is constructed of the other of the projection and the groove of first tube segment 144. In this example, groove 60 positioned on the second tube segment and projection 58 is positioned on the first tube segment, forming a spline in this embodiment. Groove 60 and projection 58 are complimentary in size and shape such that they engage one another. As can be readily understood, projection 58 and groove 60 can also be positioned on the second and first tube segments, respectively. In referring to FIG. 7, the rotation of either tube segment 144 or 146 will transmit a torque force and rotation to the other of tube segment 144 and 146.

In referring to FIG. 6, in the second embodiment of the telescopic tube assembly 136, assembly 136 includes one end portion 138 and an opposing end portion 140. First tube segment 144 is associated with opposing end portion 140 and second tube segment 146 is associated with one end portion 138. As can be readily appreciated, the positions of first tube segment 144 and second tube segment 146 could be reversed in position such that first tube segment 144 would be associated with one end portion 138 and second tube portion 146 could be associated with opposing end portion 140. In the embodiment shown, the end portion 138 of the second embodiment of the telescopic tube assembly 136, includes lever 50. Lever 50, as described earlier for the first embodiment in FIG. 2, engages a constricting cable (not shown) that is positioned circumferentially about the outside of petals 24 such that, with rotation imparted to lever 50, tension can be applied to the constriction cable. The tension can be released with the opposite rotation applied to lever 50. As was the configuration positioning for the first embodiment of the telescopic tube assembly 36, wherein another first embodiment of the telescopic tube assembly 36 was positioned on an opposing side of pylon 14, so can the second embodiment of the telescopic tube assembly 136 with lever 50 can be positioned on the opposing side of pylon 14. With tension applied to the constricting cable, constricting cable would apply a converging force on petals 24 reducing the area from which the fan flow exits engine assembly 12. As seen in FIGS. 3-5, petal 24 with constricting cable not in tension, is positioned in a normal straight out position. In contrast, with tension applied to constricting cable petals 24' converge on fan flow opening of engine assembly 12.

The opposing end portion 140, as seen in FIG. 6, of the second embodiment of telescopic tube assembly 136 is secured to the fixed portion or wall member 18 (not shown) of the jet engine assembly 12 with a bearing 142, such that bearing 142 permits the opposing end 140 of the telescopic tube assembly 136 to rotate relative to the fixed portion or wall member 18 of jet engine assembly 12. The one end portion 138 of the telescopic tube assembly 136 is secured to the thrust reverser translating sleeve 16 (not shown) with a second bearing 150 which permits the telescopic tube assembly 136 to rotate relative to the sleeve 16.

In further referring to FIG. 6, a drive motor 152 having a first drive gear 154 secured to the drive motor and engaged to a second drive gear 156. Second drive gear 156 is secured to the telescopic tube assembly 136, such that drive motor 152 rotates the first drive gear 154 and in turn rotates the second drive gear 156 thereby rotating the telescopic tube assembly 136. Also, provided is a ratchet wheel 158 secured to telescopic tube assembly 136 with a pawl 160. This ratchet wheel 158 and pawl 160 will assist in maintaining telescopic tube assembly 136 in a fixed position which was obtained. The ratchet wheel 158 and pawl 160 assembly assists to maintain lever 50 in a fixed position and alleviates burden on motor 152 in maintaining lever 50 such position.

While various embodiments have been described above, this disclosure is not intended to be limited thereto. Variations can be made to the disclosed embodiments that are still within the scope of the appended claims.

What is claimed:
1. An aircraft, comprising:
  a jet engine assembly; and
  a telescopic tube assembly positioned on the jet engine assembly, the telescopic tube assembly comprising:
    one end portion of the telescopic tube assembly is secured to a thrust reverser translating sleeve of the jet engine assembly; and
    an opposing end portion of the telescopic tube assembly is secured to a fixed portion of the of the jet engine assembly, wherein:
      an electrical cable positioned within and extends along the telescopic tube assembly; and
      the telescopic tube assembly extends from opposing end portion such that with thrust reverser translating sleeve in a deployed position an opening is positioned between the thrust reverser translating sleeve and the fixed portion of the jet engine assembly with the telescopic tube assembly extending across the opening; and
    at least two tube segments, wherein:
      a first tube segment has a greater interior dimension than an exterior dimension of a second tube segment permitting the second tube segment to slide within the first tube segment;
      the first tube segment comprises one of a projection and groove extending along a length of the first tube segment; and
      the second tube segment comprises the other of the projection and the groove of the first tube segment, wherein:
        the one of the projection and the groove of the first tube segment comprises a size complimentary to engage the other of the one of the projection and the groove of the second tube segment; and
        rotation of one of the first and second tube segments, in turn, imparts rotation to the other of the first and second tube segments wherein the one end portion of the telescopic tube assembly comprises a lever, which rotates with the first and second tube segments and which engages a constricting cable which extends circumferentially about petals associated with the jet engine assembly.

2. The aircraft of claim 1, wherein the jet engine is secured to the aircraft.

3. The aircraft of claim 1, wherein the telescopic tube assembly comprises a first length with the thrust reverser translating sleeve in a stowed position.

4. The aircraft of claim 1, wherein the telescopic tube assembly comprises a second length with the thrust reverser translating sleeve in the deployed position, wherein the telescopic tube assembly extends across the opening positioned between the thrust reverser translating sleeve in the deployed position and the fixed portion of the jet engine assembly.

5. The aircraft of claim 1, further including the cable which extends within and along the telescopic tube assembly wherein the cable comprises a coiled configuration such that the cable extends in length with a tension force placed on and along a length of the cable.

6. The aircraft of claim 1, wherein the opposing end portion of the telescopic tube assembly is secured to the fixed portion of the jet engine with a bearing, such that the bearing permits the opposing end portion of the telescopic tube assembly to rotate relative to the fixed portion of the jet engine assembly and the one end portion of the telescopic tube assembly is secured to the thrust reverser translating sleeve with a second bearing which permits the telescopic tube assembly to rotate relative to the thrust reverser translating sleeve.

7. The aircraft of claim 6, further including a drive motor having a first drive gear secured to the drive motor and engaged to a second drive gear, which is secured to the telescopic tube assembly, such that the drive motor rotates the first drive gear and in turn rotates the second drive gear thereby rotating the telescopic tube assembly.

8. A jet engine assembly, comprising:
  a telescopic tube assembly positioned on the jet engine assembly, comprising:
    at least two tube segments, wherein:
      a first tube segment has a greater interior dimension than an exterior dimension of a second tube segment permitting the second tube segment to slide within the first tube segment;
      the first tube segment comprises one of a projection and groove extending along a length of the first tube segment; and
      the second tube segment comprises the other of the projection and the groove of the first tube segment, wherein:
        the one of the projection and the groove of the first tube segment comprises a size complimentary to engage the other of the one of the projection and the groove of the second tube segment, and
        rotation of one of the first and second tube segments, in turn, imparts rotation to the other of the first and second tube segments;
    one end portion of the telescopic tube assembly is secured to a thrust reverser translating sleeve of the jet engine assembly, comprises one of the first and second tube segment; and
    an opposing end portion of the telescopic tube assembly is secured to a fixed portion of the of the jet engine assembly, comprises the other of the one of the first and second tube segment, wherein:
      the one end portion of the telescopic tube assembly comprises a lever which rotates with the first and second tube segments and which engages a constricting cable which extends circumferentially about petals associated with the jet engine assembly; and the telescopic tube assembly extends from the fixed portion such that with thrust reverser translating sleeve in a deployed position an opening is positioned between the thrust reverser translating sleeve and the fixed portion of the jet engine assembly and the telescopic tube assembly extends across the opening wherein an electrical cable is positioned within and extends along the telescopic tube assembly.

9. The jet engine of claim 8, wherein the jet engine assembly is secured to an aircraft.

10. The jet engine of claim 8, wherein the telescopic tube assembly comprises a first length with the thrust reverser translating sleeve in a stowed position.

11. The jet engine of claim 8, wherein the telescopic tube assembly comprises a second length with the thrust reverser translating sleeve in the deployed position, wherein the telescopic tube assembly extends across the opening positioned between the thrust reverser translating sleeve in the deployed position and the fixed portion of the jet engine assembly.

12. The jet engine of claim 8, further including the cable which extends within and along the telescopic tube assembly wherein the cable comprises a coiled configuration such that the cable extends in length with a tension force placed on and along a length of the cable.

13. The jet engine of claim 8, wherein the opposing end portion of the telescopic tube assembly is secured to the fixed portion of the jet engine assembly with a bearing, such that the bearing permits the opposing portion end of the telescopic tube assembly to rotate relative to the fixed portion of the jet engine assembly and the one end portion of the telescopic tube assembly is secured to the thrust reverser translating sleeve with a second bearing which permits the telescopic tube assembly to rotate relative to the sleeve.

14. The jet engine of claim 13, further including a drive motor having a first drive gear secured to the drive motor and engaged to a second drive gear, which is secured to the telescopic tube assembly, such that the drive motor rotates the first drive gear and in turn rotates the second drive gear thereby rotating the telescopic tube assembly.

15. A method for protecting a cable of a jet engine assembly, comprising the steps of:

providing a telescopic tube assembly positioned on the jet engine assembly, comprising: at least two tube segments, wherein:

a first tube segment having an interior dimension; a second tube segment having an exterior dimension, wherein the interior dimension of the first tube segment is greater than the exterior dimension of the second tube segment, such that the first tube segment slides within the second tube segment; the first tube segment comprises one of a projection and grove extending along a length of the first tube segment; and the second tube segment comprises the other of the projection and the groove of the first tube segment, and:

the one of the projection and the groove of the first tube segment comprises a size complimentary to engage the other of the one of the projection and the groove of the second tube segment, and rotation of one of the first and second tube segments, in turn, imparts rotation to the other of the first and second tube segments; wherein:

one end portion of one of the telescopic tube assembly is affixed to a thrust reverser translation sleeve of the jet engine assembly and comprises one of the first and second tube segment; and an opposing end portion of the telescopic tube assembly is affixed to a fixed portion of the jet engine assembly and comprises the other of the one of the first and second tube segment, wherein:

the one end portion of the telescopic tube assembly comprises a lever which rotates with the first and second tube segments and which engages a constricting cable which extends circumferentially about petals associated with the jet engine assembly; and wherein the telescopic tube assembly extends from the fixed portion such that with thrust reverser translating sleeve in a deployed position an opening is positioned between the thrust reverser translating sleeve and the fixed portion of the jet engine assembly and the telescopic tube assembly extends across the opening wherein an electrical cable is positioned within and extends along the telescopic tube assembly; and moving the thrust reverser translation sleeve from a closed position to the deployed position thereby positioning the first and second tube segments from a stowed position to a deployed position.

16. The method for protecting a cable of claim 15, further including moving the thrust reverser translation sleeve from the deployed position to the closed position thereby positioning the first and second tube segments from the deployed position to the stowed position.

17. The method for protecting a cable of claim 15, further including rotating one of the first and second tube segments thereby imparting rotation to the other of the first and second tube segments.

* * * * *

UNITED STATES PATENT AND TRADEMARK OFFICE
CERTIFICATE OF CORRECTION

PATENT NO. : 10,422,301 B2  
APPLICATION NO. : 14/797930  
DATED : September 24, 2019  
INVENTOR(S) : Kent Edmund Karnofski et al.

Page 1 of 1

It is certified that error appears in the above-identified patent and that said Letters Patent is hereby corrected as shown below:

On the Title Page

Item (57), Line 7, "of the of the" should be -- of the --.
Item (57), Line 13, "of the of the" should be -- of the --.

In the Claims

At Column 7, Line 36, "of the of the" should be -- of the --.
At Column 8, Line 63, "of the of the" should be -- of the --.
At Column 10, Line 4, "grove" should be -- groove --.

Signed and Sealed this  
Fifth Day of May, 2020

Andrei Iancu  
*Director of the United States Patent and Trademark Office*